United States Patent [19]

Goodrich, Jr. et al.

[11] 4,358,211

[45] Nov. 9, 1982

[54] PIVOT JOINT WITH VISUAL PRELOAD INDICATOR

[75] Inventors: Stanley R. Goodrich, Jr., Saginaw; Jerry M. Roethlisberger, Bridgeport, both of Mich.

[73] Assignee: General Motors Corporation, Detroit, Mich.

[21] Appl. No.: 504,021

[22] Filed: Sep. 9, 1974

Related U.S. Application Data

[63] Continuation of Ser. No. 179,094, Jul. 9, 1971, abandoned.

[51] Int. Cl.³ .............................................. F16C 11/06
[52] U.S. Cl. ....................................... 403/27; 403/132
[58] Field of Search ........................... 403/27, 132, 138

[56] References Cited

U.S. PATENT DOCUMENTS

| | | | |
|---|---|---|---|
| 2,644,549 | 7/1953 | Cagle | 188/370 |
| 2,811,377 | 10/1957 | Latzen | 403/137 |
| 2,977,131 | 3/1961 | Moskovitz et al. | 403/76 X |
| 3,055,456 | 9/1962 | Pfeiffer | 116/114 Q |
| 3,061,344 | 10/1962 | Gray et al. | 403/125 |
| 3,103,377 | 9/1963 | Scheublein, Jr. et al. | 403/75 |

FOREIGN PATENT DOCUMENTS 456942 11/1936 United Kingdom .................. 403/138

*Primary Examiner*—Andrew V. Kundrat
*Attorney, Agent, or Firm*—F. J. Fodale

[57] ABSTRACT

A preloaded pivot joint subject to wear in normal use has a protuberance on its internal movable bearing seat which protrudes through the pivot joint cover. As the joint wears, the degree of protrusion progressively diminishes. Indicia are provided on the protrusion and cover cooperatively to identify to the observer whether wear justifying replacement does or does not exist. Wear giving rise to loss in preload sufficient to warrant replacement of the pivot joint is indicated when the top surface of the protuberance recedes to a position having a predetermined observable relationship with the top surface of the cover. The elastomeric ring which provides the preload also provides a seal for an internal grease chamber which is accessible from a fitting in the protuberance.

2 Claims, 2 Drawing Figures

PIVOT JOINT WITH VISUAL PRELOAD INDICATOR

This application is a Continuation of application Ser. No. 179,094, filed Sept. 9, 1971, now abandoned.

Our invention relates generally to pivot joints, and more specifically, to preloaded pivot joints.

Preloaded pivot joints are a basic mechanical element which are always assembled into a more comprehensive mechanical device. As such, the preload characteristics of the pivot joint must be matched to the requirements of the mechanical device with which it is used. Therefore, the change in preload characteristics of the pivot joint after some period of use due to wear must be known to determine if the pivot joint is still suitable for the requirements of the mechanical device or if it requires replacement. It is not difficult to appreciate that the cost of removing an in-service pivot joint from the mechanical device, if required to determine the preload characteristics of the joint, could be very large relative to the cost of the pivot joint itself. Such a situation could lead to premature or later replacement of the pivot joint neither of which is desirable. Therefore, an indication of the preload characteristics of a pivot joint in a mechanical device which can be obtained without removing the pivot joint from the mechanical device is useful for both preventing the unnecessary cost of replacing yet serviceable pivot joints and for indicating that a pivot joint should be replaced.

In its broadest aspects then, the object of our invention is to provide a preloaded pivot joint in which the preload characteristics of the pivot joint can be determined while the pivot joint is in a mechanical device without disassembling the pivot joint from that device.

Another object of our invention is to provide a pivot joint wherein the amount of preload in the pivot joint is visually indicated so that the pivot joint need not be removed from a more comprehensive mechanical device to determine if the pivot joint is yet serviceable or if it requires replacement.

A feature of our invention is that the preloaded pivot joint provided with a visual preload indicator is completely sealed.

Another feature of our invention is that the preloaded pivot joint with a visual preload indicator has an increased grease capacity and the grease can be replaced or replenished as required.

Yet another feature of our invention is that the preloaded pivot joint with a visual indicator is simplified in construction by combining functions of a preload spring and a seal into a single elastomeric ring.

The exact nature of our invention, as well as other objects and features thereof, will be readily apparent from consideration of the following specification relating to the annexed drawings in which.

Figure 1:
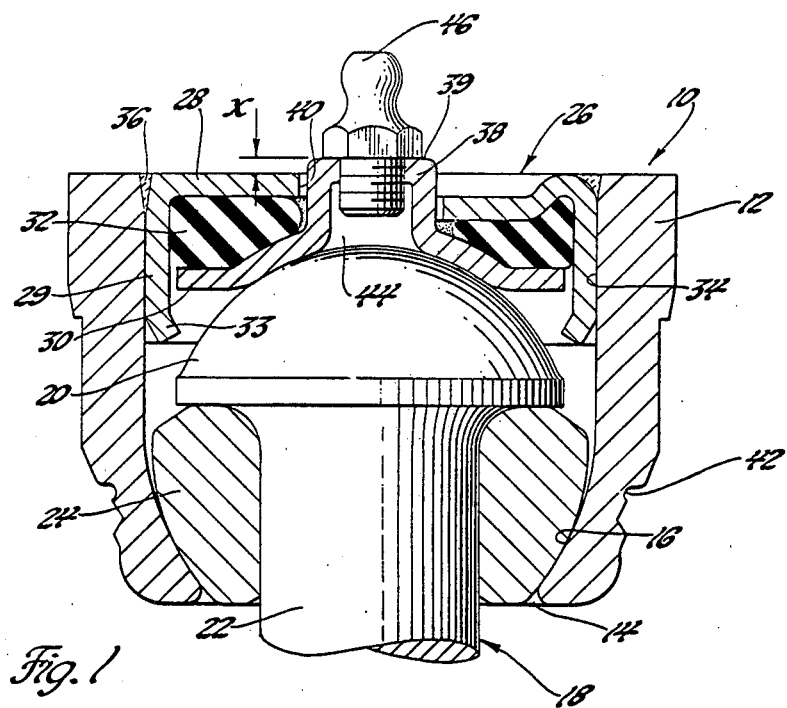
FIG. 1 is a sectional elevational view of a pivot joint with a visual preload indicator in accordance with our invention.

Referring now to the drawings, and more specifically to FIG. 1, the pivot joint indicated generally at 10 comprises a housing 12 having an opening 14 at its lower end. The interior of the housing 12 includes a partispherical bearing seat 16 adjacent the lower opening 14. A stud 18 comprising a head 20 and a shank 22 is disposed in the housing 12 with the shank 22 protruding through the opening 14. A bearing ring 24 embraces the shank 22 beneath the head 20 and is seated on the bearing seat 16. The upper end of the housing 12 is closed by a capsule assembly 26.

The capsule assembly comprises a cover 28, an upper bearing seat 30 and an elastomeric ring 32. The lower edge of an outer cylindrical flange 29 on the cover 28 is staked at 33 to provide for convenient handling of the capsule assembly 26 as a unit. The capsule assembly 26 is telescoped into a bore 34 at the upper end of the housing 12 by virtue of the outer cylindrical flange 29 on the cover 28. In manufacturing the pivot joint, an external load is placed on the cover 28 snugly seating the internal parts of the pivot joint and compressing the elastomeric ring 32 between the cover 28 and the upper bearing seat 30. While the external load is maintained, the cover 28 is electron beam welded to the housing 12 at 36. This method of manufacturing the pivot joint provides a precise preload on the pivot joint as is described in the U.S. Pat. No. 3,555,662 issued to Thomas C. Powell on Jan. 19, 1971, for a Method of Manufacturing Uniform Preload Ball Joint Assemblies and assigned to the assignee of this invention.

Thus when new, the pivot joint 10 is preloaded to a precise predetermined degree which is matched to the requirements of the mechanical device with which the pivot joint is to be used. As the pivot joint is used, wear occurs and is compensated for by expansion of the elastomeric ring 32 which moves the upper bearing seat 30 downwardly. Expansion of the elastomeric ring, however, also decreases the preload which is a characteristic with which our invention is concerned.

Figure 2:
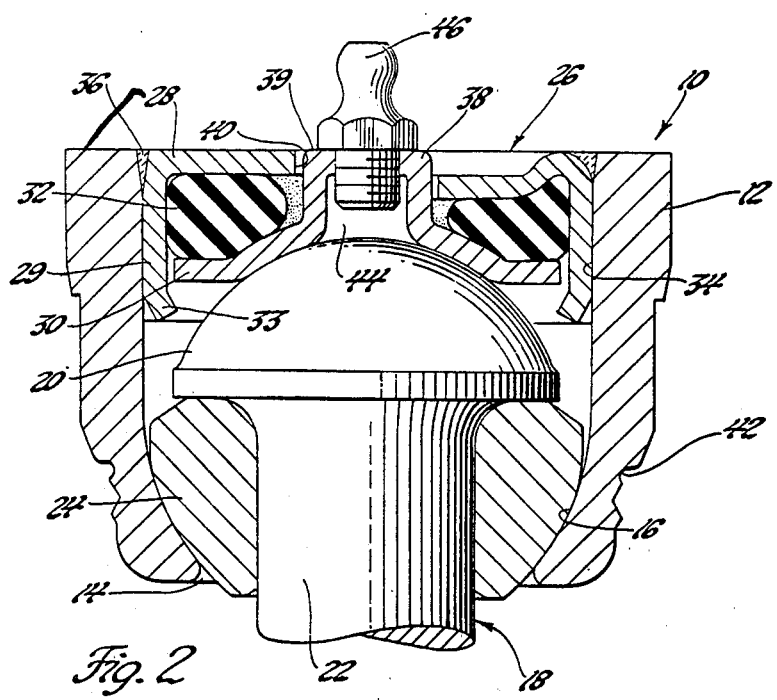
FIG. 2 is a view similar to FIG. 1 and shows the visual preload indicator in an operative position which indicates that the pivot joint should be replaced.

The upper bearing seat 30 includes a protuberance 38 which projects through a central aperture 40 in the cover 28. As illustrated in FIG. 1, the upper planar surface 39 of the protuberance 38 projects beyond an upper planar surface on the cover 28 by a distance indicated as X. The distance X is indicative of the amount of preload initially provided by the elastomeric ring 32. As the pivot joint is used in service and wear is compensated for by expansion of the elastomeric ring 32, the protuberance 38 recedes toward the cover 28 diminishing the distance X. The particular mechanical device with which the pivot joint is used determines the point at which the preload is reduced to a level which is no longer suitable for the requirements of the device. The change in preload which can be tolerated can be transformed into the amount of allowable expansion of the elastomeric ring 32. This, in turn, can be indicated by preselecting the distance X so that when the preload is reduced to a no longer acceptable level, the protuberance 38 has receded into the cover 28 to the point where the upper planar surface 39 on the protuberance lies flush with an upper planar surface on the cover 28 as shown in FIG. 2. Thus our invention provides a simple visual means for determining whether an in-service pivot joint is suitable and still has a useful life (if the protuberance 38 still protrudes from the cover 28), or if the in-service pivot joint requires replacement because wear has reduced the preload to a level below that required by the mechanical device (when the upper planar surface 39 on the protuberance 38 is flush with an upper planar surface of the cover 28).

It is also to be noted that the electron beam welding at 36 provides a complete seal between the cover 28 and the housing 12, and that the elastomeric ring 32 seals the pivot joint interior from the aperture 40 in the cover 28 so that the upper end of the pivot joint is completely sealed. The lower end of the pivot joint is sealed by a conventional boot (not shown) which is mounted in the exterior housing groove 42 at one end and engages the lower end of the shank 22 at the other end. Thus a pivot joint in accordance with our invention is completely sealed, and can, therefore, be packed with grease. Moreover, the interior of the protuberance 38 provides a grease chamber 44 which increases the grease capacity of the pivot joint. Grease in chamber 44 reaches the interior parts of the pivot joint by flowing between the stud head 20 and the upper bearing seat 30. Grease is replenished or replaced through the fitting 46 located in the protuberance 38.

We wish it to be understood that we do not desire to be limited to the exact details of construction shown and described, for obvious modifications will occur to a person skilled in the art.

We claim:

1. A pivot joint comprising
   a housing having an upper and a lower opening,
   a lower bearing seat in said housing,
   a stud unit having a head and a shank,
   said head being disposed in said housing and bearing against said lower bearing seat in an engagement subject to wear in use,
   said shank protruding through said lower opening,
   a cover for said upper opening having a visually exposed aperture therethrough and an exterior, substantially planar surface contiguous with said visually exposed aperture,
   means permanently securing said cover to said housing and fixing the position of said aperture and said exterior, substantially planar surface with respect to said housing throughout the life of the pivot joint,
   an upper bearing seat in said housing disposed between said cover and said head and bearing against said head in an engagement subject to wear in use,
   a protuberance telescopically disposed in said visually exposed aperture in juxtaposition thereto, and
   spring means in said housing preloading said head into engagement with said seats and moving said protuberance downwardly in unison with the upper bearing seat as the head and bearing seats wear,
   said protuberance having a grease fitting secured to an upper end thereof and a substantially flat upper surface extending laterally beyond the maximum circumferential boundary of said grease fitting, said substantially flat upper surface being initially spaced a preselected distance above said exterior substantially planar surface of said cover, which preselected distance is substantially equal to the distance that the substantially flat upper surface travels under bias of said spring means between a first position determined by an initial unused condition of said head and bearing seats and a second position determined by a worn condition of said head and bearing seats warranting replacement of the joint,
   said substantially flat upper surface of the protuberance and said substantially planar surface of said cover being necessarily substantially coplanar when said worn condition occurs and simultaneously visually exposed to the exterior of said joint thereby giving a visual indication from outside the joint that replacement is warranted.

2. The pivot joint as defined in claim 1 wherein said protuberance is an integral part of said upper bearing seat and wherein said spring means consists of a compressed elastomeric ring disposed between said cover and said upper bearing seat.

* * * * *